United States Patent
Hayes et al.

(10) Patent No.: US 6,882,344 B1
(45) Date of Patent: Apr. 19, 2005

(54) METHOD FOR EXAMINING FONT FILES FOR CORRUPTION

(75) Inventors: Eric J. Hayes, Tigard, OR (US); Kerry D. Kelly, Portland, OR (US)

(73) Assignee: Extensis, Inc., Portland, OR (US)

( * ) Notice: Subject to any disclaimer, the term of this patent is extended or adjusted under 35 U.S.C. 154(b) by 451 days.

(21) Appl. No.: 09/625,275

(22) Filed: Jul. 25, 2000

(51) Int. Cl.[7] .............................................. G06T 11/00
(52) U.S. Cl. ...................... 345/467; 358/1.11; 358/1.14
(58) Field of Search ................................ 345/467, 471, 345/471.1, 471.2, 472, 947, 948, 117 FOR; 707/529, 542

(56) References Cited

U.S. PATENT DOCUMENTS

| | | | | |
|---|---|---|---|---|
| 5,877,776 A | * | 3/1999 | Beaman et al. | 345/472 |
| 5,963,641 A | * | 10/1999 | Crandall et al. | 380/2 |
| 6,073,147 A | * | 6/2000 | Chan et al. | 715/542 |
| 6,253,374 B1 | * | 6/2001 | Dresevic et al. | 717/11 |
| 6,650,433 B1 | * | 11/2003 | Keane et al. | 358/1.15 |
| 2002/0120648 A1 | * | 8/2002 | Ball et al. | 707/511 |

FOREIGN PATENT DOCUMENTS

JP 402004288 * 1/1990 ............ G09G/1/02

OTHER PUBLICATIONS

"*Fontsync Introduction*" by Apple Computer, Inc., published Dec. 4, 2000 (showing revisions back to Oct. 15, 1999).
Ronny Richardson, MS–DOS Batch File Programming, 1990, Windcrest, 2nd Edition, pp. 372,382–383,398,412, 414.*

* cited by examiner

Primary Examiner—Matthew C. Bella
Assistant Examiner—Greg Cunningham
(74) Attorney, Agent, or Firm—Banner & Witcoff, Ltd.

(57) ABSTRACT

A method for examining font files for corruption involves an font manager communicating with a remote font server which stores uncorrupted font files. A portion of the font file to be checked for corruption may be compared with the uncorrupted font file to determine whether the file is corrupted. If the file is corrupted, an uncorrupted font file may be downloaded to the font manager to replace a portion of the corrupted font file containing the actual font file as opposed to a portion of the font file which may include other information such as kerning information.

13 Claims, 12 Drawing Sheets

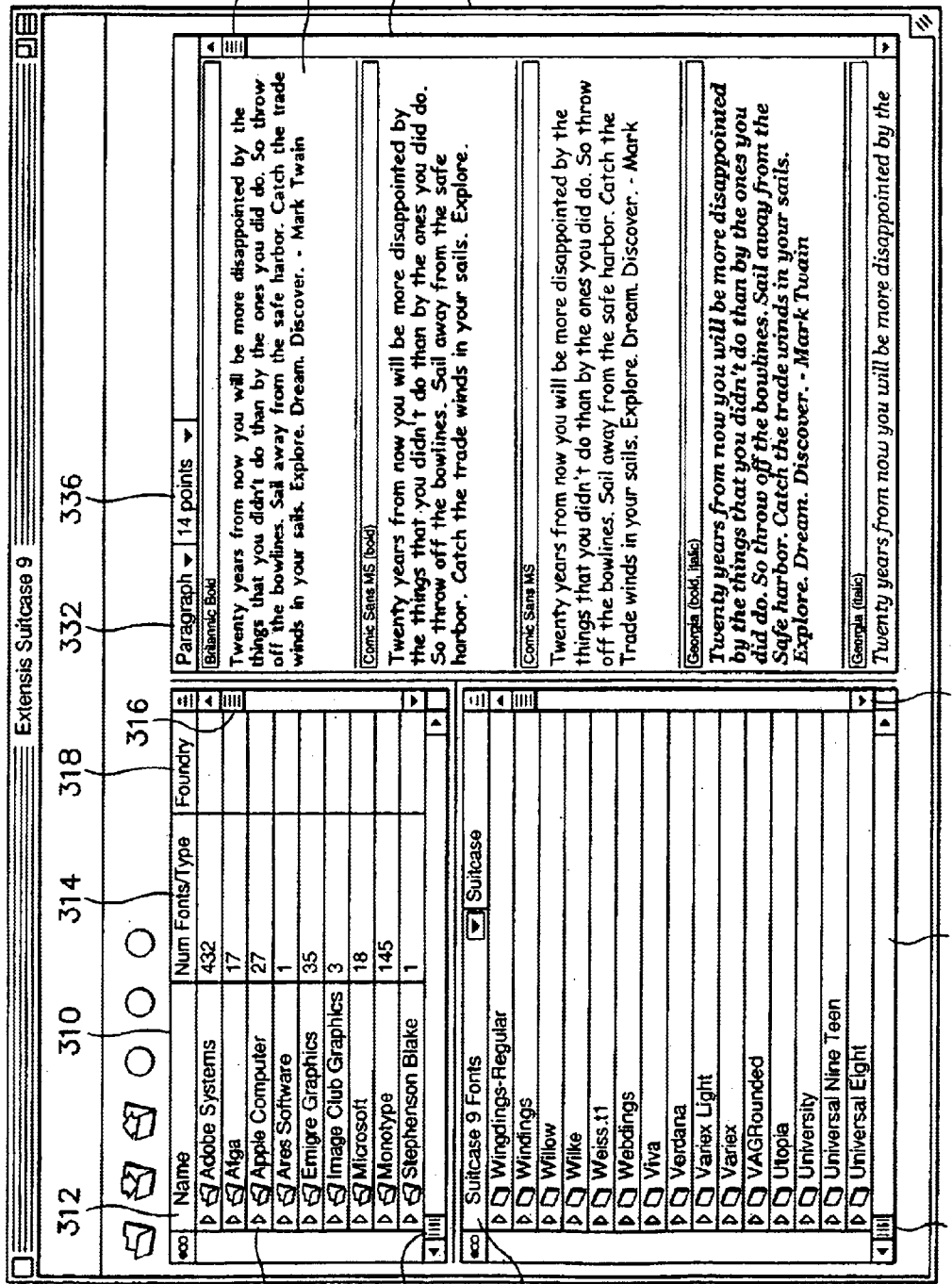

| Font |
|---|
| *AGaramond* |
| Arial |
| Charcoal |
| Chicago |
| Courier New |
| [icons] |
| Geneva |
| ✓ Helvetica |
| Monaco |
| [icons] Poppl-Laudatio |
| Symbol |
| Times New Roman |

| | |
|---|---|
| *AGaramond BoldItalic* | Ps |
| AGaramond Bold | Ps |
| *AGaramond Italic* | Ps |
| *AGaramond SemiboldItalic* | Ps |
| AGaramond Semibold | Ps |
| AGaramond | Ps |

FIG.6

METHOD FOR EXAMINING FONT FILES FOR CORRUPTION

I. FIELD OF THE INVENTION

The invention is directed to managing fonts, and more particularly to a system and method for examining font files for corruption.

II. BACKGROUND OF THE INVENTION

Word processing programs, desktop publishing applications, and other computer programs conventionally allow users to select different fonts for creating and printing documents. As the number of fonts has increased over the years, it has become more difficult for users to manage different fonts. Creative professionals, in particular, need to select from among a broad variety of typefaces and other stylistic options when creating documents, advertisements and the like. Although commercially available software packages typically include a nominal number of fonts with the price of the software, users must frequently pay extra money to install additional fonts on a computer.

Computers typically store fonts in separate files that can be added to or deleted from the computer system as desired. By installing additional font files on a computer, the operating system can make the fonts available to programs running on the computer. When a computer user wishes to use a font from within a word processing program, the program queries the operating system for a list of available fonts, including an image showing how each font will appear when used in the program. If a large number of fonts is installed on a single computer, the list of fonts can be unwieldy and difficult to manage. In particular, requiring that a user scroll through a list of thousands of fonts is inconvenient. Moreover, the operating system consumes additional memory to maintain information regarding the many different installed fonts.

One conventional approach for managing a large numbers of fonts on a single computer is shown in FIG. 1. A word processing program 101 interacts with an operating system 102 to "enumerate" fonts that are installed on the computer, and the font details are returned to the program 101. Installed fonts 103 may be stored in a font folder and a system registry database that maintains information regarding the fonts. A font installation program 104 can be used to add or delete fonts from the system.

In one conventional approach, a separate font manager application 106 is added to the basic system to configure fonts into separate groups, each of which can then be "activated" by a user. A separate font grouping database 105 stores information regarding a superset of available fonts arranged into groups (e.g., Font Group 1, Font Group 2), and the user operates font manager application 106 to create new groupings and activate a given font group.

When a font group is activated, font manager application 106 installs fonts from the activated group in the installed fonts database 103. When a font group is deactivated, font manager application 106 removes fonts from the installed fonts database 103. Thus, the operating system only maintains knowledge regarding a small subset of the total universe of fonts that can be installed on the computer, and when the user selects fonts from word processing program 101, the operating system returns information only for those fonts that are installed in the installed font database 103. One product that provides font management capabilities of the type shown in FIG. 1 is the Adobe Type Manager (ATM) Deluxe product sold by Adobe of San Jose, Calif. In an alternate variation of the scheme in FIG. 1, the font retrieval functions of the operating system are replaced with substitute functions that then reference fonts in a grouped database such as database 105 instead of the installed fonts.

Although the font management scheme illustrated in FIG. 1 has greatly simplified the tasks of creative professionals, several factors have led to the need for additional font management features.

Conventional word processing programs permit users to preview only one font in a particular font size at a time, making it difficult or impossible to compare different fonts on the same display. As shown in FIG. 2, for example, a conventional font selection dialog box 200 allows the user to select one font (e.g., Times New Roman) 201 from a list of fonts and one font size (e.g., 14 pt) from a list of font sizes, and a corresponding preview window or area 202 shows what that selected font in the specified font size will look like based on a predetermined sentence fragment (e.g., "The Quick Brown Fox . . . "). In order to preview another font (or font size), the user must select a different font (or font size), which will then be previewed in the previewing area 202. Consequently, it is unwieldy to browse through a large number of fonts, and difficult or impossible to compare two different fonts and/or font sizes side by side. Similarly, the conventional font manager application 106 of FIG. 1 only permits the user to preview one font of one font size at a time.

The increasingly networked nature of computers, both in local area networks and as part of the Internet, has led to configurations under which different users in a collaborative setting (e.g., within a company) may have different and potentially conflicting fonts installed on their computers. Thus, for example, if two graphic artists within a corporation have each selectively activated different groups of fonts on their computers, when one artist sends a document to the other artist, the document may not be capable of being displayed on the second computer because of a non-activated font. Consequently, a need exists for resolving this problem.

Yet another problem relates to corrupted font files. Particularly in the Macintosh world, corrupted font files frequently lead to problems in creating and printing of documents. While some basic tests can be run on a suspect font file to determine whether the file is likely to be corrupted, such tests are limited in nature and cannot guarantee that a given file is corrupted or not. Once a user identifies a corrupted font file, he or she must manually replace the file with a trusted original file. Consequently, there is a need to simplify the process of detecting and repairing corrupted font files.

Finally, the fact that fonts are generally protected under copyright laws has led the creators of fonts to seek ways of limiting their unauthorized distribution. Although various encryption and copy protection schemes have been used in recent years to protect computer files, such schemes are difficult to implement for font files, which must typically be readily accessible to operating systems and application programs. If a networked computer user is able to freely share font files installed on one computer with other unauthorized users, the copyright owner may lose revenues due to lost potential sales. Accordingly, additional protection mechanisms are needed to protect the unauthorized use of large numbers of copyrighted font files.

III. SUMMARY OF THE INVENTION

The present invention overcomes these shortcomings by providing a method of managing font to address the shortcomings of the prior art.

According to one aspect of the present invention, a font preview area is provided where multiple fonts may be viewed simultaneously. Thus, fonts do not need to be active in order to be previewed. In addition, a single font in varying font sizes may be viewed concurrently.

According to another aspect of the present invention, multiple fonts, each font being displayed in varying sizes may be previewed simultaneously. In another aspect of the invention, fonts may be viewed in different formats such as alphabetically with all standard alphanumeric characters being viewed together. Further, customized text may be previewed using multiple fonts and font sizes simultaneously. In yet another aspect of the invention, text may be previewed in paragraph form.

According to another aspect of the invention, a list or menu of available fonts may be shown on a screen, where each font name is displayed in its own font face.

In another aspect of the invention, fonts may be accessed from a central server on an external network such as the Internet. One of the benefits of this aspect is that creative professionals working together can utilize a common server that maintains all available fonts including separate defined font groups. According to another aspect of the invention, the central server can provide a warehouse of fonts, so that anyone accessing the server may purchase one or more fonts for use.

In yet another aspect of the invention, a method is provided for checking font files to determine if they are corrupted. In one aspect of this feature, a font file may be sent to a font server, where the font server determines whether the font file is corrupted. In the event that a file is corrupted, the server may automatically replace the corrupted file with a known uncorrupted file or provide the user with the option of replacing the corrupted file. Further, in font files that contain other resources, for example kerning information, the portion of the font file where the font information is located may be replaced.

In another aspect of the invention, a server containing a library of fonts is provided, where the server monitors whether the maximum number of authorized (e.g., licensed) users have checked out or activated a font. If the maximum number of authorized uses of the font has been reached, the server prevents access to the font. A counter may be used to keep track of how many users have activated, installed or downloaded the font.

These and other novel advantages, details, embodiments, features and objects of the present invention will be apparent to those skilled in the art from following the detailed description of the invention, the attached claims and accompanying drawings, listed herein, which are useful in explaining the invention.,

III. BRIEF DESCRIPTION OF DRAWINGS

FIGS. 3A–3D respectively show an illustrative user interface for previewing fonts according to the present invention.

Figure 4:
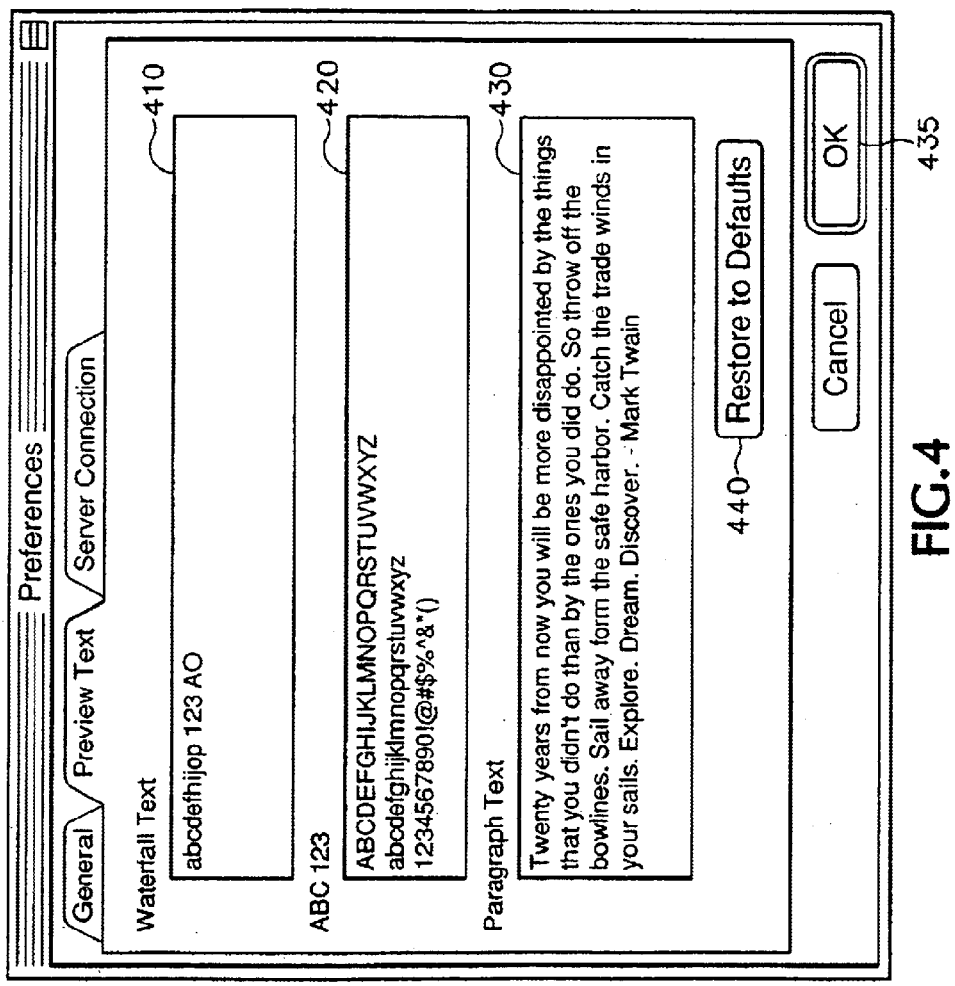

FIG. 4 shows an illustrative preferences window for allowing a user to customize text being previewed in any of three exemplary preview formats according to the present invention.

Figure 5:
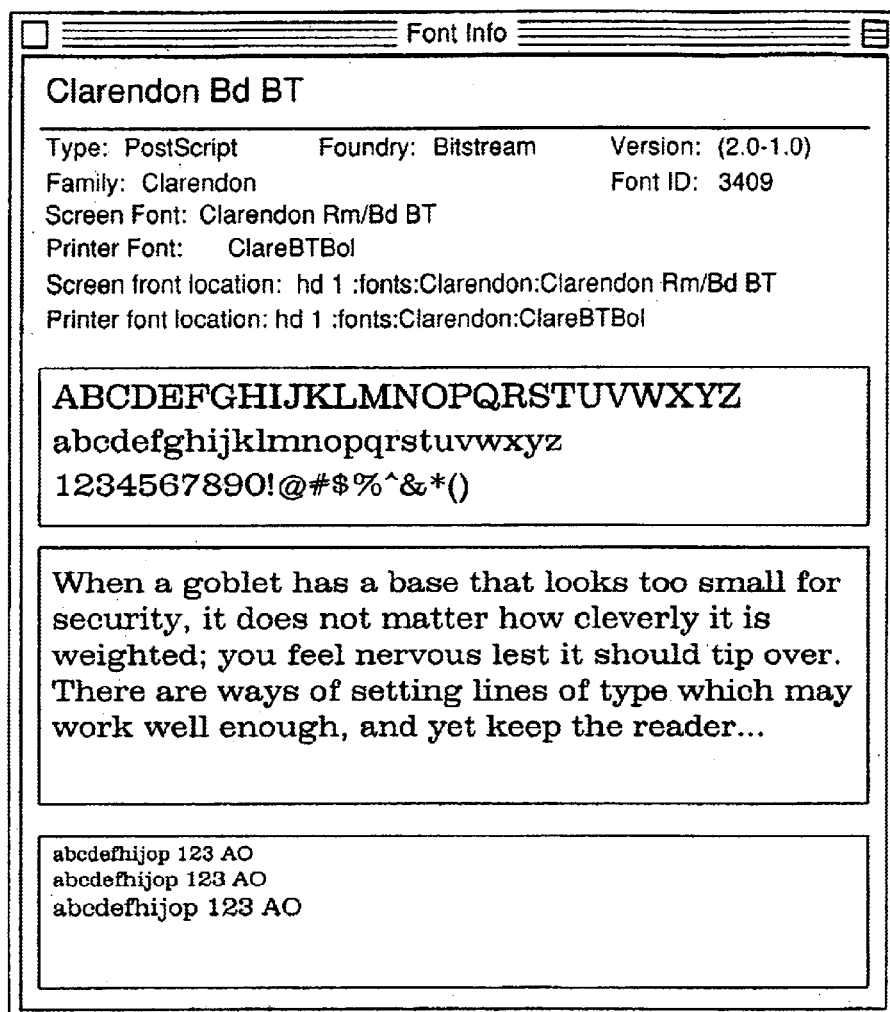

FIG. 5 shows an illustrative font info window for viewing information regarding a selected font including the font in various preview formats.

FIG. 6 shows an illustrative font menu according to the present invention.

Figure 7:
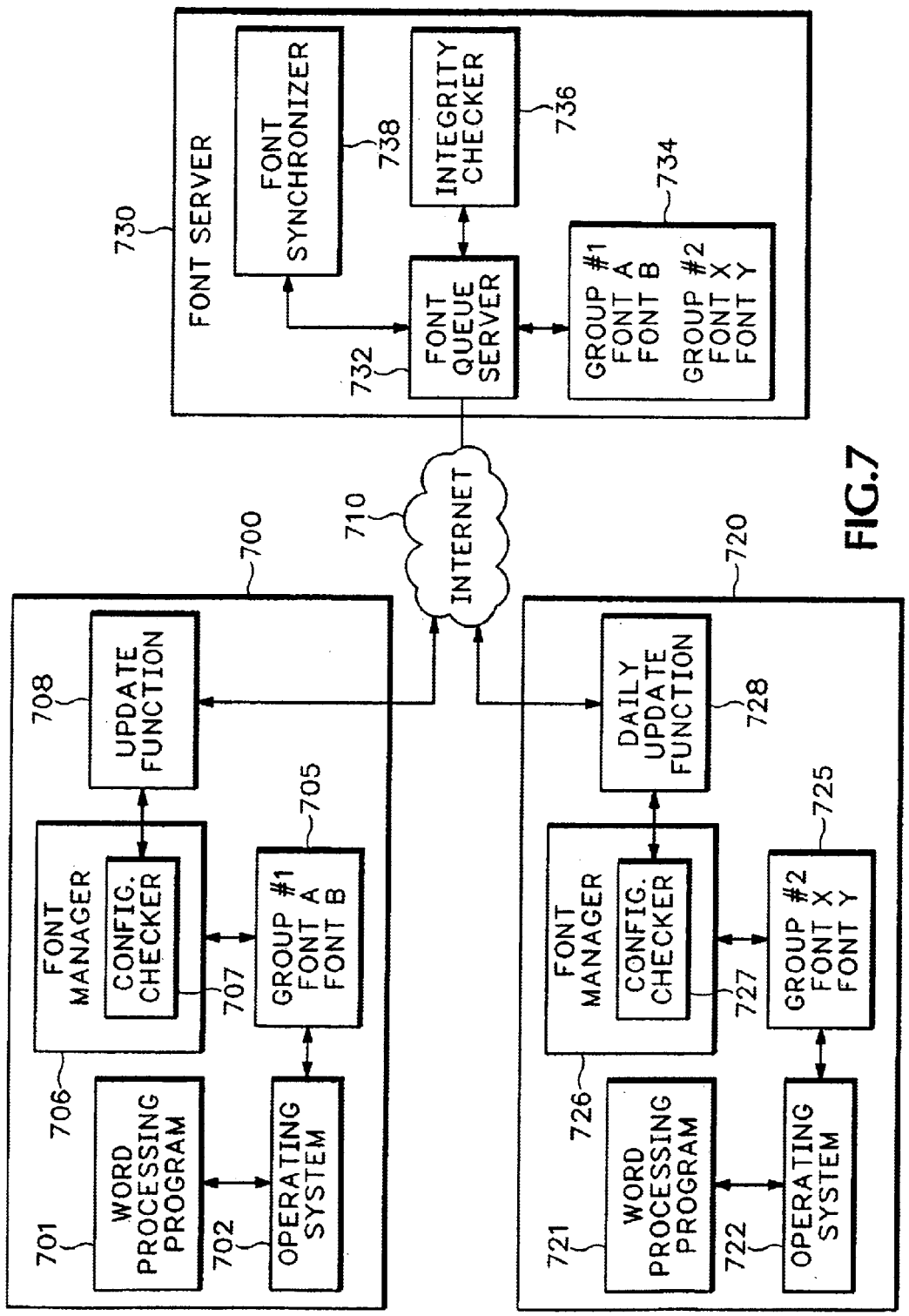

FIG. 7 shows an illustrative network system including computer systems and a font server according to an illustrative embodiment of the present invention.

Figure 8:
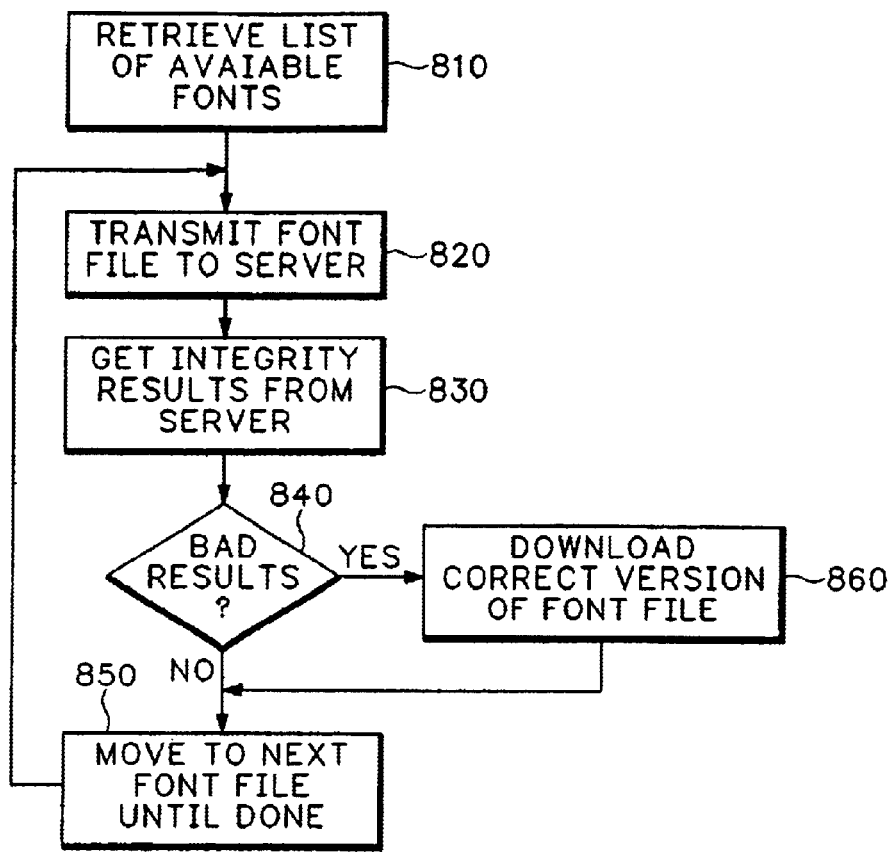

FIG. 8 shows an illustrative method for checking a font file for corruption according to the present invention.

Figure 9:
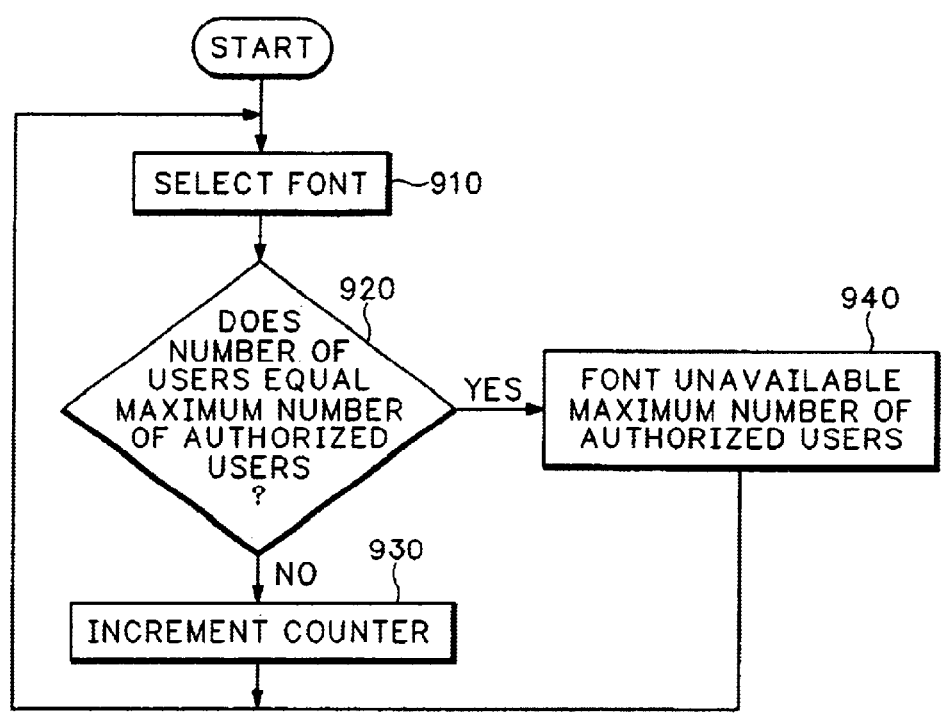

FIG. 9 shows an illustrative process for implementing limited access to fonts according to the present invention.

IV. DETAILED DESCRIPTION

The present invention relates to a font management system for managing the availability and usage of a large number of fonts for specific applications. Embodiments of the invention below are described using a mouse. It should be understood that other user input devices may be employed including, but not limited to, keyboard, a track ball, touch screen, voice recognition circuitry, infrared control and the like.

Figure 1:
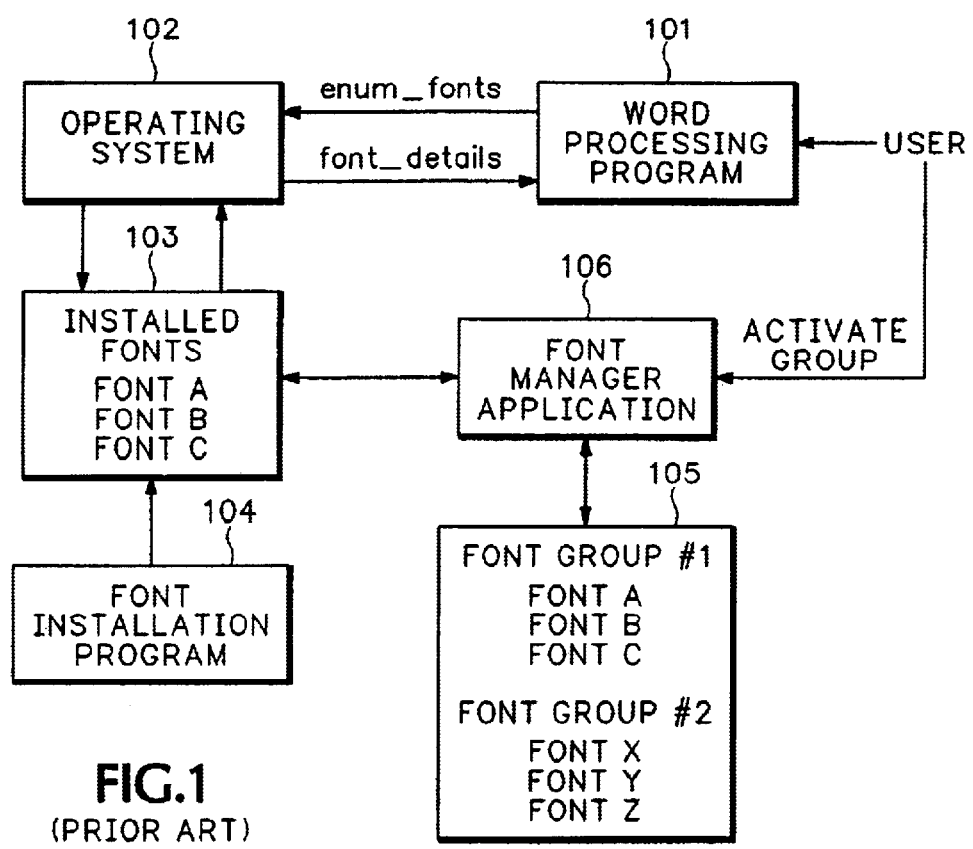
FIG. 1 shows a conventional system for managing a large numbers of fonts on a single computer.
Figure 2:
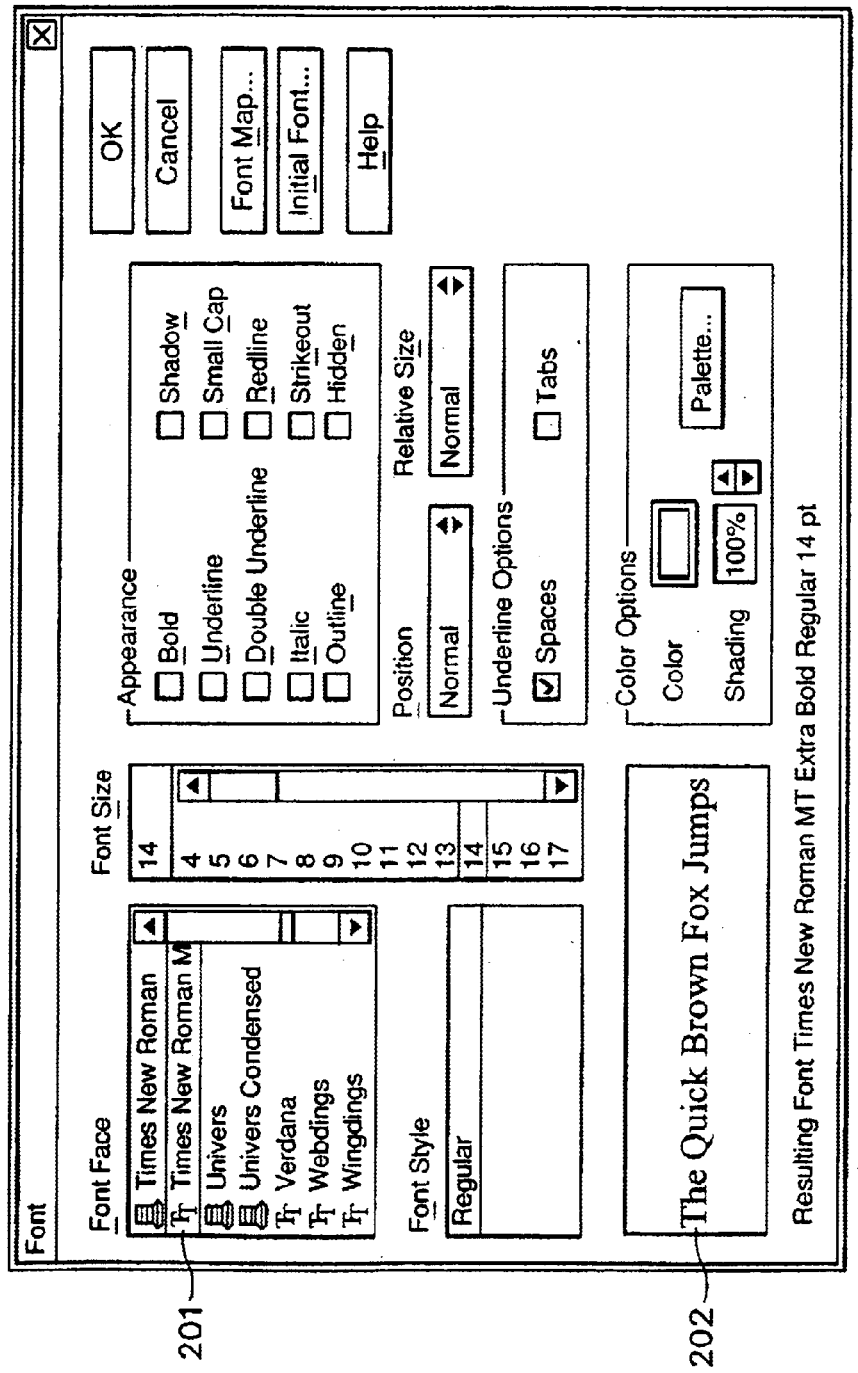
FIG. 2 shows a conventional font selection dialog box for a word processing application.

A method of previewing fonts according to the present invention may be implemented in the general structural environment of FIG. 1 by adding new functional responsibilities to the font manager application 106. As with conventional systems, a font manager application may be employed which interfaces with a font grouping database 105, which stores one or more groups of user-defined, predefined or otherwise dynamically defined font groups. According to the invention, fonts may be grouped, for example, by job, customer, foundry, or application. Responsive to a user selection or activation of a particular font group, the font manager application 106 installs the activated or selected font group in the installed fonts database 103. Thus, the fonts in the activated font group become available for the application being run by the user for example, a word processing program 101. Illustrative word processing programs include, among others, MS Word, Corel WordPerfect and the like.

According to the present invention, fonts in a defined font group or any font available to the font manager application 106 may be previewed in a preview window displayed on a display screen. An illustrative user interface (UI) 300 for previewing fonts is shown in FIGS. 3A–3D. Three separate pane areas are shown in FIGS. 3A–3D, font group area 310, available font area 320 and font preview area 330.

In font group area 310, a subset of illustrative font groups are identified (e.g., Adobe Systems, Image Club Graphics, Microsoft) in the font group name section 312 and the number of fonts in the font group can be displayed adjacent to the font group name in the num fonts/type section 314. A scroll bar 316 is provided so that a user may scroll down the list of font groups. When a user moves a cursor on the UI 300 to highlight or select one of the font groups, text can be previewed in the font preview area 330 for fonts found in the highlighted or selected font group. Alternatively, the user may change the activation status of the font group by checking a selection box or some other selection method. In the illustrative embodiment shown in FIGS. 3A–3D, the Microsoft font group has been highlighted for preview in the font preview area 330.

A user may click on an icon 315 in the font group area 310 and a menu of the fonts (not shown) in the font group can be listed immediately beneath the font name. Also, the foundry of each individual font may be displayed adjacent to the font name in the foundry area 318 in the font group area 310. It should be understood that any number of information fields may be available for each font group or individual font in the font group area 312. Scroll bar 319 allows a user to access additional information by moving the window of the font group area horizontally. From the menu of fonts in the selected group, the user may select a subset of fonts for previewing by, for example, clicking on various fonts in a font group. Further, a user may click on an individual font type and a submenu (not shown) for that font may appear including a list of various forms of the font. For example, for courier font, the submenu may include courier, courier bold, courier bold and courier italic. Thus, a user may preview various forms of an to) individual font and/or compare one or more forms of one font with one or more forms of other fonts in the font preview area 330.

In the illustrative embodiments shown in FIGS. 3A–3D, the font manager is configured so that when a font group is selected various forms of an individual font can be displayed. That is, in the font preview area 330 in FIGS. 3A–3D, various forms of the Georgia font are shown, Georgia (standard), Georgia (bold), Georgia (bold, italic) and Georgia (italic). It should be understood that this set up may be predefined in the font manager or dynamically altered according to the user's discretion.

In the available font area 320, a subset of the available font types is listed in the font type area 322 with the remainder being accessible by scrolling through the font type list using the scroll bar 324. Similar to the font group area 312, information concerning the font type may be displayed in fields forming a row using scroll bar 326. A user may click on an available font and a menu listing of the various forms of the font may be provided. The available font and font forms may be selected or highlighted in the same manner as the font groups, fonts in the groups or forms of the fonts in the groups, as described with respect to the font group area 310. Also, a font selected from the font group area 310 may be previewed with a font selected from the available font area 320.

The font preview area 330 provides a pane for viewing the selected fonts or font groups concurrently. Various preview formats can be provided by the font manager application 106 for viewing the fonts. In the illustrative embodiments of FIGS. 3A–3D, the font preview format is identified in the font preview type format box 332 and the font preview size format box 336. A default format may be provided upon entry into the font manager application 106, which may be predefined at the time of developing the font manager application and further modified by a user is desired. FIGS. 3A–3D show four illustrative font preview formats according to the present invention.

Figure 3A:
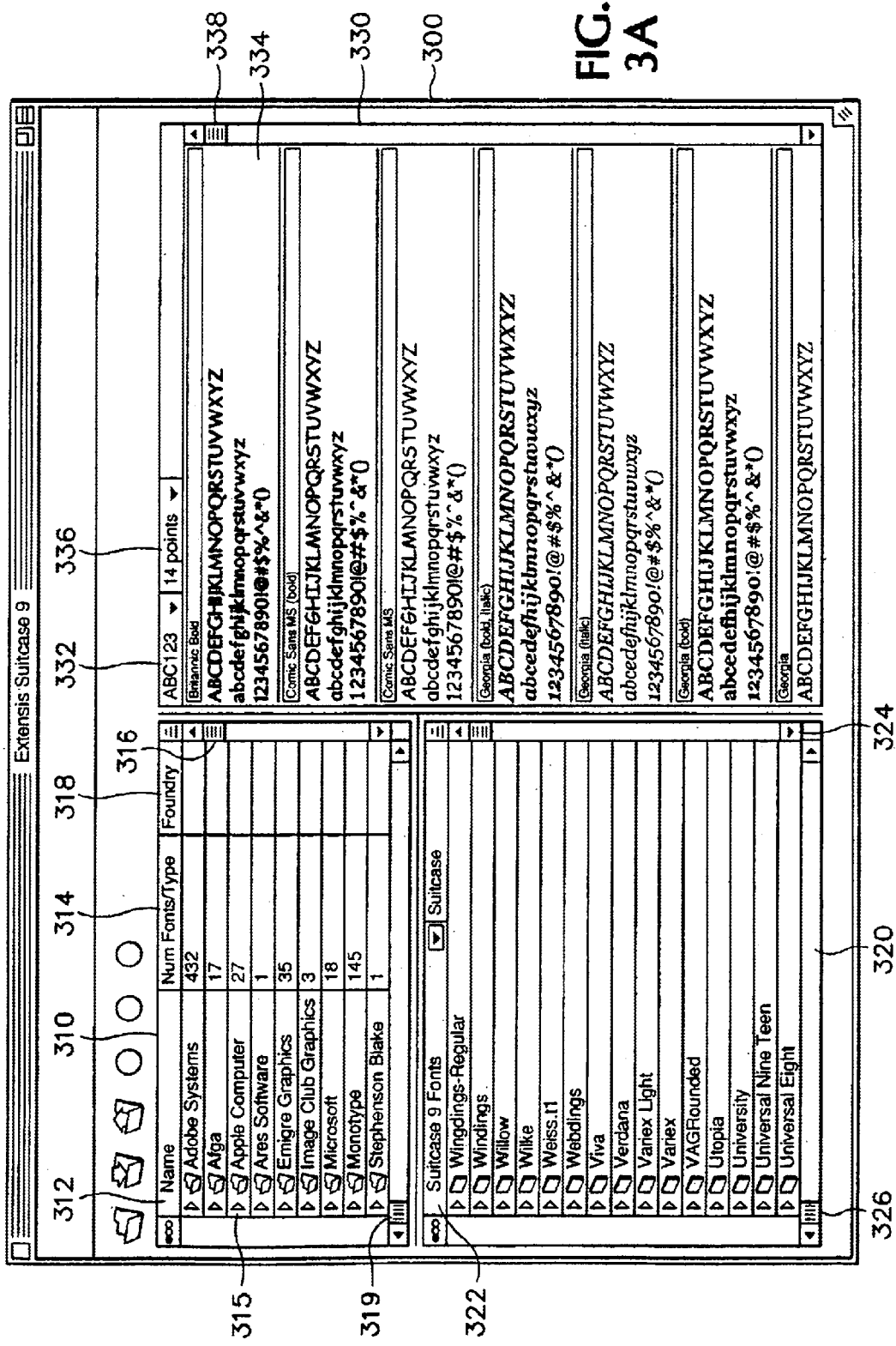

In FIG. 3A, the font preview type format defined in the font preview type format box 332 is "ABC 123", which indicates that the selected font or fonts shown in the font preview display area 334 of the font preview area 330 are in alphanumeric order, in upper and lower case. The font size preview format box 336 indicates that the displayed text is point size. A scroll bar 338 is provided, which can be used to allows a user to view other fonts selected for preview, when the font preview display area 334 cannot display each of the selected fonts.

Figure 3B:
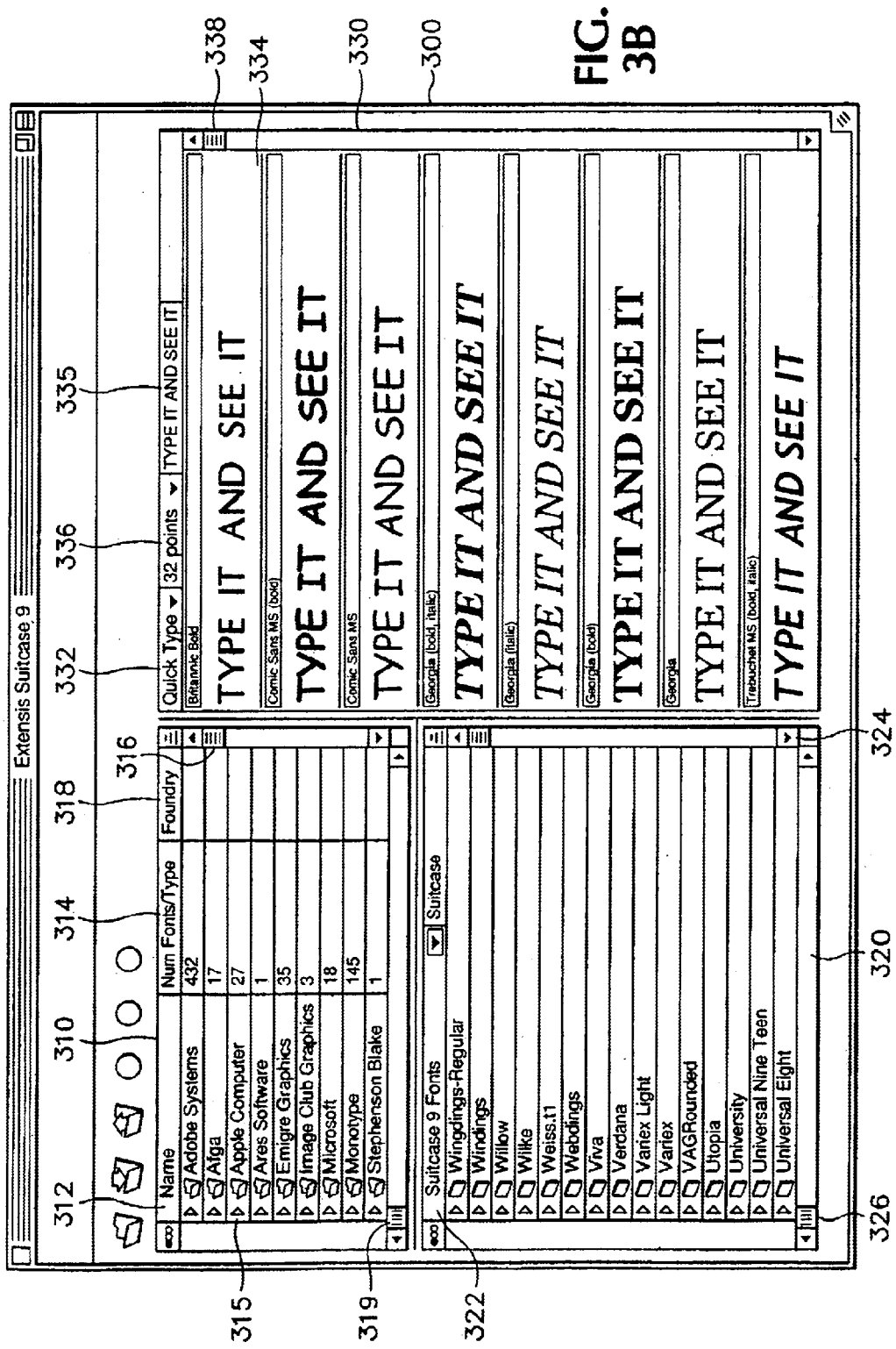

In FIG. 3B, the font preview format type defined in the font preview type format box 332 is "QuickType™", which indicates that the text displayed will correspond to text a user types in the text box 335 in the font preview area 330. The font preview size format box 336 indicates that the text is point size. That is, the user may type in any desired text string for previewing in the font preview display area 334 and in real time the text appears in the font preview display area in the various fonts.

In FIG. 3C, the font preview type format box 332 indicates that the text to be displayed is "Paragraph", which indicates that text displayed is in paragraph type form showing how a paragraph would appear in the selected font and size. The font preview size format box 336 indicates that the font is point size.

Figure 3D:
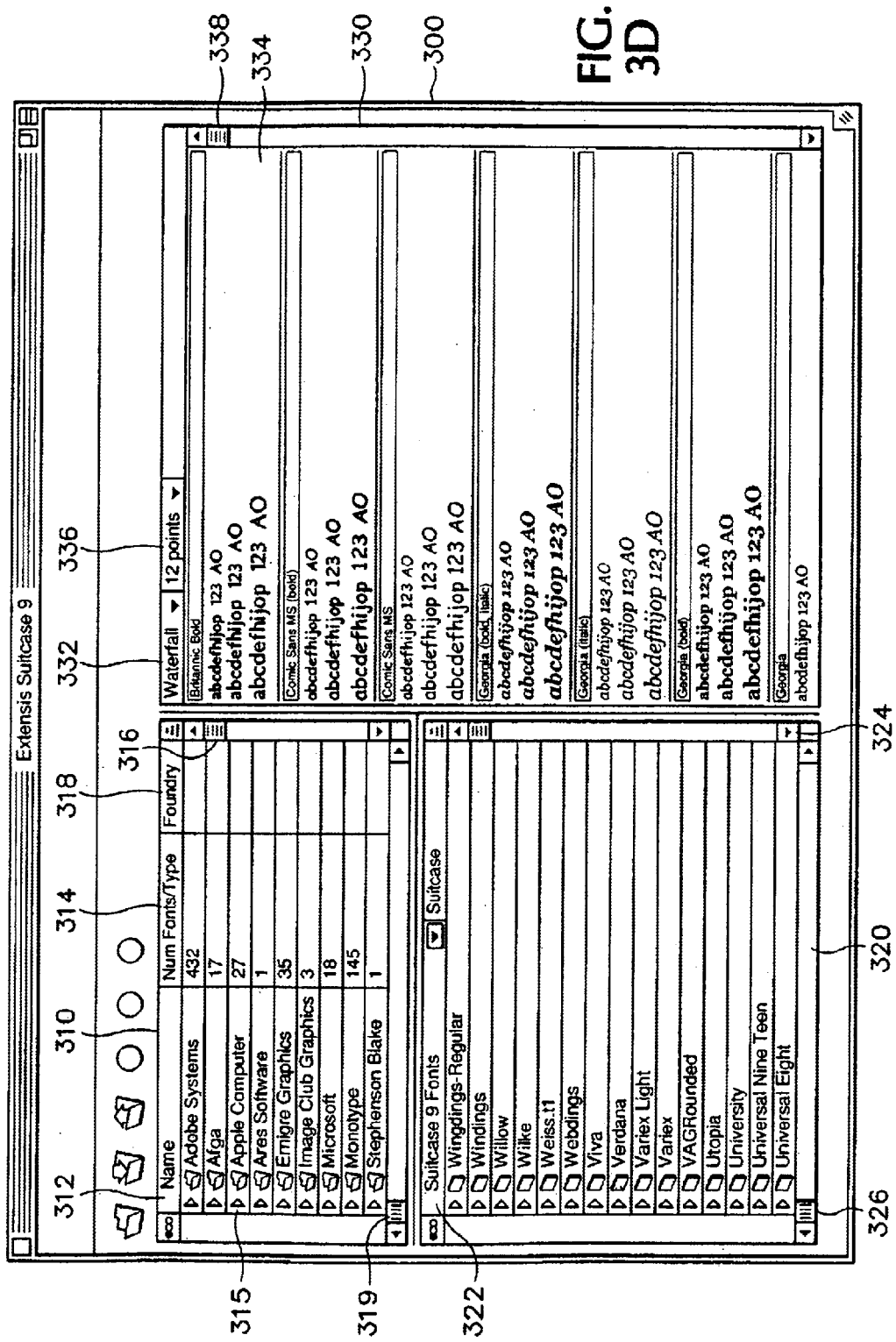

In FIG. 3D, the font preview format type defined in the font preview type format box 332 is "Waterfall", which indicates that a cascade of the selected font will be shown in the font preview display area 334. The waterfall format of FIG. 3D shows a display of alphanumeric characters, which may be customized by the user. The waterfall format allows a user to view text in each font in several different font sizes. In the embodiment shown in FIG. 3D, the font size indicated in the font preview size format box 336 is points. Fig. D shows three samples of cascading text for each font with the font size indicated being the second of the three lines of text for each font shown. The first line of text in a particular font can be displayed in a size smaller than 12 points (e.g., points) and the third line of text can be displayed in a size larger than 10 points (e.g., points). The waterfall format can be modified to provide the first set line of text in the selected font size and the next two lines in increasingly larger sizes. The size differential between lines of text may be points or any other differential as predefined by the application or user. The waterfall format allows the user to preview multiple fonts of multiple sizes simultaneously.

A user may switch between font formats by clicking on the font preview type format box 332 and selecting the desired preview format from a drop down menu listing each of the available preview formats. Similarly, the user may modify the font size by clicking on the font preview size format box 336. Also, the user may print out the information displayed in UIs in FIGS. 3A–3D by selecting the print function from a file menu (not shown).

The text appearing in the ABC 123, Waterfall and Paragraph formats may be customized by the user or may be default text. From a "file" menu (not shown), a user may select "Preferences" and a Preferences window appears. Selecting the "Preview Text" tab from the Preferences window provides a window as shown in FIG. 4. A user can modify the text that appears when previewing a font in the font preview display area 334 by entering the desired text for the particular format to be in the text area associated with the respective format; text area 410 for waterfall, text area 420 for ABC 123, and text area 430 for paragraph and selecting the OK button 435. Default text displays can be restored by pressing the Restore to Defaults button 440 followed by the OK button 435.

Information about a particular font may be viewed by selecting a font and choosing "Get Info" from the file menu (not shown). An illustrative font info window is shown in FIG. 5. Information shown can include, but is not limited to, font type, foundry, version number and samples of the font displayed in various preview modes. Further, a user may print out the information in the form including the preview displays shown in the font info window by selecting the print function from a file menu (not shown).

Another feature of the present invention allows the user to select from a menu such as the file or edit menu, a fonts menu, which provides a drop down menu of fonts showing each of the font names in it's respective font face. An illustrative font menu is shown in FIG. 6. Also, the menu is configurable so that the user may view the selected fonts such as pi or symbol fonts in a standard font rather than in unintelligible symbols. Also, the font menu may provide functionality where fonts of one face are grouped together. Thus, instead of showing AGaramond and AGaramond semibold in the main menu, they can be grouped together in a submenu as shown in FIG. 6.

FIG. 7 shows an illustrative embodiment of the present invention where one or more computer systems are coupled to a font server over the Internet. A first computer system 700 includes a word processing program 701 (or any application which uses fonts) which interacts with an operating system 702 to enumerate fonts installed on the computer and returns the font details to the word processing program 701. A font manager application 706 is added to the basic system to configure fonts into separate groups that can be activated by a user. A font group database 705, coupled to the operating system 702 and font manager application 706, stores in information including a selected font group, which has been activated by a user for use with the word processing program 701. The font group database 705 may include other available groups of fonts, which may be activated for use.

When the font manager application 706 is launched, a configuration checker 707 operates to determine where the available fonts are located. Some of the available fonts may be located in the font group database 705, but according to the present invention, some or all of the fonts can be located on a remote font server 730. The configuration checker 707 determines the address (e.g., IP address) of the available fonts and forwards the address to the update function 708. The update function 708 determines whether the available fonts on the font server 730 have been downloaded through a previous launching of the file manager application 706 or otherwise. If the available fonts have been downloaded, the font manager application 706 then operates in a conventional manner. However, if an update is required, the update function 708 sends a request across a TCP/IP connection over the Internet 710 to the font server 730.

When an update is required, the update function 708 may address the request through an active or always on Internet connection (e.g., DSL, ADSL) over the Internet 710. If an Internet connection is not active, the user may be provided with a dialog box asking whether an Internet connection should be launched. In response to a yes command from the user, an Internet connection may be launched by the operating system 702. Alternatively, the connection may be automatically launched without user authorization.

Computer system 720 is another system on the network and contains elements 721, 722, 725, 726, 727 and 728 which operate in the same manner as elements 701, 702, 705, 706, 707 and 708, respectively. Therefore, further description of computer system 720 has been omitted for simplicity.

A request received from computer system 700 directed to font server 730 is received by font query database 732, which determines the nature of the query. When the query is for available fonts and/or font groups, the font query database 732 accesses a font server font database 734 to collect the information and send the available font information with the assistance of the font synchronizer 738 back over the Internet to the computer system 700. The font synchronizer 738 helps to format and synchronize the information being sent to the computer system 700 to avoid any synchronization errors. The update function 708 receives the font information and passes the information to the font manager 706.

The received font information (e.g., individual fonts and font groups) may be stored by the font manager 706 in a font directory in the font group database 705. At this point, the user may modify existing font groups or define new font groups including fonts received from the font server 730. A user can activate a font group received from the font server 730 or a group including a font received from the font server 730 and other fonts stored in the font group database 705.

In a preferred implementation of the present invention, an organization can have all their available font groups stored on the font server 730 to ensure that all their creative professionals have access to and are using the same groups of fonts. Periodically, for example, each time a user turns off their computer the font directory in the font group database 705 may be erased. This erasure helps to ensure that each user in a particular organization is using the most up to date available fonts and font groups.

It should be understood that the update function 708 may be set to determine whether an update is needed on some other basis, for example, every time the application is newly launched, monthly, etc. According to one embodiment, a flag can be set each time the font directory in the font group database 705 is erased to indicate that an update is required.

When the font group database 705 includes available fonts from both the font server 730 and locally accessed from the font group database 705, each font group including a font obtained from the font server 730 can be erased. Alternatively, when a group, which formerly included a font from the font server 730, is selected by a user after the font directory downloaded from the font server 730 has been erased, a user can be notified of the system modification to the group. For example, a prompt can appear asking the user whether he desires to determine if the font is still available or to select another font by accessing the available fonts on the font server 730.

The connection over the Internet may be a TCP/IP connection. The font server 730 may server multiple organizations where a received access request may include addressing information to the font server font database 734 corresponding to the organization of the requesting party. In this regard, the font server 730 may provide fonts for sampling and purchase by a particular party.

According to this feature of the invention, available fonts stored on the font server 730 may include fonts for sale. Thus, when the update function 708 requests available fonts, some fonts for sale may be sent over the Internet 710 to the computer system 700 of the requesting party. In this instance, a font for sale may be sent with timeout information, thus allowing a user to sample the font for a period of time and when the time expires disabling the font. Also, at the expiration of the sampling period, the user may be prompted as to whether he desires to purchase the font. If so, a user can be prompted with a purchase form screen. Alternatively, an account for the user or the user's organization may be charged or debited. Upon purchase of the font, the font can again be enabled for use. For instance, the font server 730 may modify, for example, a flag bit associated with a particular font in the user or user's organizations font server font database 734. Thus, the present invention provides a user with the ability to preview and purchase fonts over the Internet in real time.

In another embodiment of the invention, a font file may be sent over the Internet 710 to a font server 730 that determines if the file is corrupted. The font manager application 706 provides a user with the ability to initiate checking of font files for corruption. By activating the font file checker function, the process shown in FIG. 8 may be initiated.

A selected font or a list of available fonts may be identified by the user to be checked in step 810.

Alternatively, all fonts may be checked. Next, in step 820 the font manager 706 can transmit a font file to be checked to the font server 730 over the Internet 710. The font query database 732 routs the font file to the integrity checker 736. The integrity checker 736 includes a database (library) of fonts. A portion of the font file to be examined for corruption is compared with its corresponding integrity font file by the integrity checker 736 in step 830. Comparison may occur in any number of ways such as on a byte by byte basis. Also, a checksum for the font file may be compared with a checksum of the corresponding integrity font file. Some font files may have custom data within the file such as kerning information. The font corruption checker would only be checking the actual font file and not necessarily the whole font file if custom data is present, such as kerning information.

In an alternative embodiment, when checking is requested, the font server 730 may determine a checksum result for a known uncorrupted font file corresponding to the font file being checked to the computer system 700 for downloading. The font manager application 706 may determine the check sum for the font file to be checked for corruption. After receiving the checksum from the font server 730 and determining the check sum for the font file being checked, the font manager application 706 can compare the two checksums and determine whether the font file being checked is corrupted. In this instance, the corruption checking results are generated at the computer system 700. In another implementation, the font manager application 706 can send the checksum result of the font being checked to font server 730, where integrity checker 736 may compare the checksums to determine whether the font file is corrupted.

If the font file is found to be uncorrupted in step 840, then control returns to step 850, and if another font file needs to be checked the process starting with step 820 is repeated until each of the requested files have been checked. In one embodiment of the invention, after each font has been checked, the font server 730 can send a font ok message to the computer system 700 for display to the user.

If the font file examined is corrupted, a message can be sent to the font manager 706 indicating that the file is corrupted and asking whether the user desires to download a corrected version of the font file. If the user says yes, in step 860, a corrected version of the corrupted font file is downloaded to the computer system 700, and overwrites the actual font file (not necessarily the whole font file) stored in the font group database 705. Next, control returns to step 850 to determine whether further font files remain to be checked. If the user opts not to correct the corrupted file, then control goes to step 850 as described.

Similar to the aspect of the invention where a font may be purchased, downloading of an no uncorrupted font may also be charged to the user. That is, when an uncorrupted font file is downloaded or the user requests that an uncorrupted version of a corrupted font be downloaded, the user or user's organization may be charged a service fee and/or a fee for the correct font. A request to check a font file for corruption may also incur a chargeable fee to a user or user's organization's account. In one implementation, before conducting the corruption checking function, the user may be prompted that a cost is associated with the checking and requested to approve the corruption checking before a font file is sent to the font server 730 for checking. Also, a user may have an account stored with credit at the font server 730 such that upon each checking operation and/or downloading operation, the appropriate charge can be debited from the account. In the event that a user's account has insufficient funds, the checker may be disabled until sufficient funds are present. The user may be prompted to provide electronic information (e.g., credit card number) to replenish the funds on the spot so that the checking process may be continued.

The file manager 706 may be set to periodically check a font file for corruption. For example, a period may be defined as to when a font file is to be checked for corruption. The period may be stored in the font group database 705. After the period has elapsed, the first time the font manager application 706 is run, the font file corruption checker process may be initiated automatically or a user may be prompted as to whether the font file should be checked. After the font file is checked, the period may be reset. Also, the user may manually reset or redefine the period through the font manager application 706.

In another embodiment of the invention, a method is provided for adding protection to data files. In one implementation of this embodiment, the font server 730 may manage the number of simultaneous users in an organization of a particular font. Font files are data files that typically can be copied and exchanged between users freely ignoring the copyright protection associated with the font files.

The present invention provides an ability to monitor the number of simultaneous users in an organization who are using a font. Thus, an organization may purchase a number of user licenses for a font and anytime the maximum number has been reached, another user requesting the font will be denied access to the font. That is, if the number of licenses for a particular font is ten and ten users have the licensed font activated individually or as part of an active font group, attempts by others to access the licensed font will be denied. Font groups as well as individual fonts may be licensed.

FIG. 9 shows an illustrative process for implementing limited access to fonts according to the present invention. An illustrative implementation of the process shown in FIG. 9 will be described using the network shown in FIG. 7. When a user accesses a font from the font server 730 and previews the font in the font manager application, the font has not been activated. The monitoring process in FIG. 9 can be initiated when the users launches the font manager 706. When the user selects a licensed font for activation or a font group, including a licensed font, for activation in step 910, the font server 730 receives a request for activation signal. The font server font database 734 determines how many authorized users are currently using the licensed font by examining a counter in step 920. If the number of users is less than the maximum number of authorized users, the counter is incremented in step 930 and an approval signal is sent to the font manager application 706 permitting the licensed font to be activated. In the event the maximum number of authorized users are using the selected font then the font manager application 706 receives a denial signal in step 940. The font manager 706 may then display a message indicating to the user that the licensed font is unavailable because the number of licensed users of the licensed font has been reached.

Each time a user of a licensed font deactivates or deletes the font, which may occur manually or by exit from the application in which the font is active, a decrement counter signal is sent to the font server 730 to decrement the counter by one.

It should be understood that a local area network server providing the font files may also monitor the number of licensed users in a manner similar to the Internet server implementation and including the process shown in FIG. 9.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for determining whether a font file is corrupted, said method comprising the steps of:
   receiving at a font server, information associated with a portion of a font file stored in a computer system;
   comparing, at the font server, the information associated with the portion of the font file with information associated with a portion of an uncorrupted font file; and
   in response to said step of comparing, determining, at the font server, whether the font file stored in the computer system is corrupted.

2. The method according to claim 1, wherein the information associated with the portion of the font file and the information associated with the portion of the uncorrupted font file is checksum data.

3. The method according to claim 1, wherein if the font file is corrupted, said method further comprising the step of replacing the portion of the font file with the portion of the uncorrupted font file.

4. The method according to claim 3, wherein said step of replacing further includes the steps of:
   transmitting the portion of the uncorrupted font file from the font server to the computer system; and
   storing the portion of the uncorrupted font file in memory in the computer system.

5. The method according to claim 1, further comprising the step of transmitting a result of said step of determining to the computer system.

6. The method according to claim 1, wherein if the font file is corrupted, said method further comprising the step of transmitting the portion of the uncorrupted file to the computer system for replacing the portion of the font file.

7. The method according to claim 6, further comprising the step of charging to replace the portion of the font file with the uncorrupted file.

8. The method according to claim 1, where if the portion of the font file is corrupted, transmitting a request to the computer system asking whether the portion of the font file should be replaced with the portion of the uncorrupted file.

9. The method according to claim 8, further comprising the steps of:
   receiving a request from the computer system for the portion of the uncorrupted font file to replace the portion of the font file;
   transmitting the uncorrupted file to the computer system; and
   charging to replace the at least a portion of the font file with the uncorrupted file.

10. The method according to claim 1, further comprising the step of charging an account associated with the computer system for performing said method.

11. The method according to claim 1, further comprising the step of displaying a message indicating whether the font file is corrupted, responsive to said step of determining.

12. The method according to claim 1, farther comprising the step of determining whether a preset corruption period has expired and initiating said step of comparing when said preset corruption period has expired.

13. The method according to claim 12, further comprising the step of resetting the corruption period in response to said step of initiating.

* * * * *